June 3, 1969 M. E. JAYKO 3,448,277
PHOTOELECTRIC ABSORPTION MEASURER HAVING PLUNGER FOR
ENCLOSING VARIABLE BEAM PATH LENGTHS
Filed Jan. 16, 1967 Sheet 2 of 2
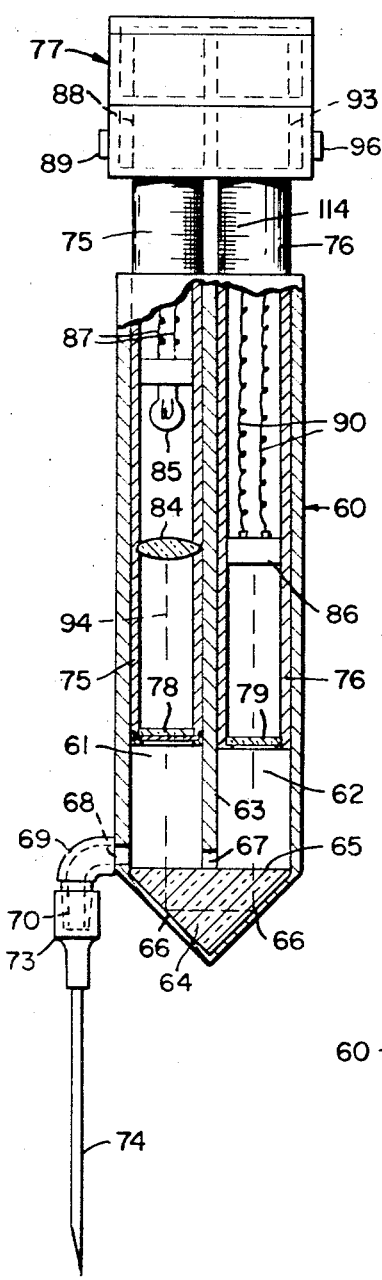
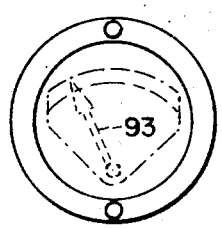
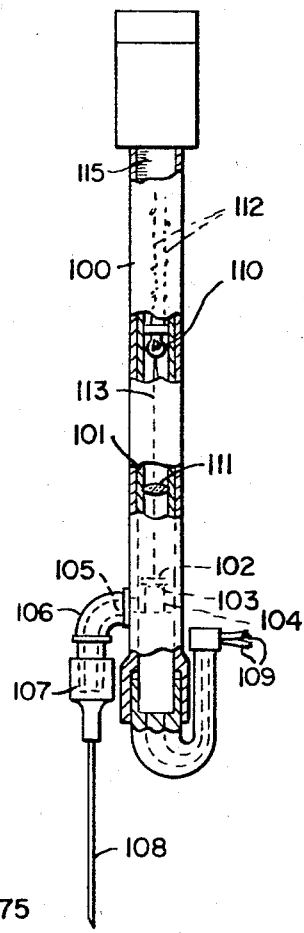
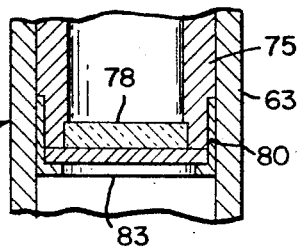
INVENTOR.
MICHAEL E. JAYKO
BY
ATTORNEYS United States Patent Office 3,448,277
Patented June 3, 1969

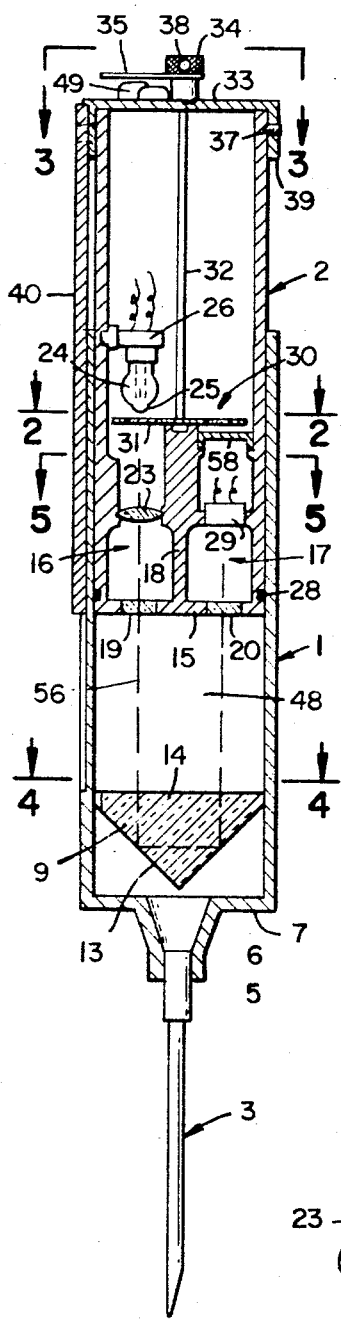
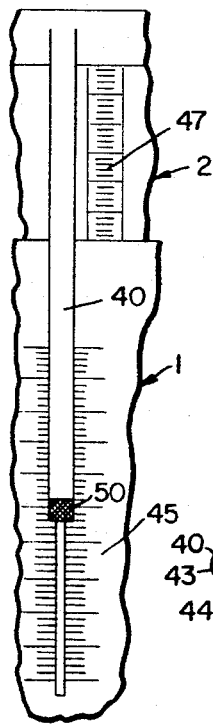
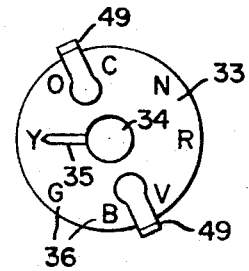
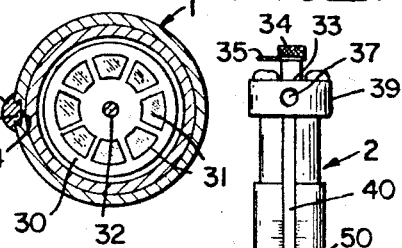
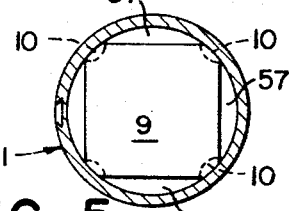
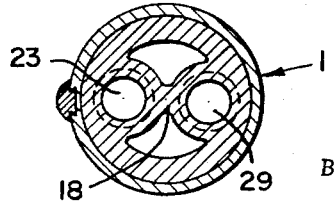

3,448,277
PHOTOELECTRIC ABSORPTION MEASURER HAVING PLUNGER FOR ENCLOSING VARIABLE BEAM PATH LENGTHS
Michael E. Jayko, Alamo, Calif., assignor to Charles A. Crete, Marysville, Calif.
Filed Jan. 16, 1967, Ser. No. 609,511
Int. Cl. G01n 21/26
U.S. Cl. 250—218          8 Claims

ABSTRACT OF THE DISCLOSURE

A device for photoelectric absorption measurements having means for producing and directing a beam of light along an enclosed path of travel and onto a sensing device responsive for indicating absorption of said light by a fluid, and also providing means for enclosing a progressively increasing section of said beam along said path with the fluid to be measured for optical density to measure and visibly indicate the degree of absorption of said section when the length of said section extending through said fluid is within a measurable range.

---

This invention relates to a photometric device for photoelectric absorption measurements such as in measuring the optical density of solutions, and has for one of its objects the provision of a device that will enable a person to analyze many different liquids and solutions within a given time, than heretofore has been possible, and to do it with optimum accuracy and efficiency.

Another object of the invention is the provision of a measuring device that will enable a person to quickly analyze a sterile solution for chemical content under sterile conditions.

A still further object of the invention is the provision of a photoelectric measuring device that is portable and adapted to be quickly moved from one solution to another for measuring the differences in the transmission of light beams of different colors and which device enables the obtaining of accurate readings under conditions where such readings are difficult to obtain, particularly because of a relatively high or relatively low density.

In clinical and chemical research, the density of liquids is determined by directing a beam of light along an optical path through the liquid to be measured. The beam is from a radiation source, such as an electric lamp, and is measured for intensity after passing through the liquid by being directed onto a conventional sensing device or detector, such as a photoelectric cell which, in turn, generates or modulates an electrical signal that is amplified and translated to a reading on a conventional meter.

Obviously, the measure of the light striking the sensing device will vary as the length of the optical path through the liquid will vary. Knowing the length of said path and the response or measure at the sensing device, the density is readily determined. This system in itself, is old. Color filters are normally provided to filter out undesirable rays in liquids of different colors.

Heretofore, portable devices of the above general nature have required immersion of a part of the device in the liquid in an open vessel during the taking of a reading, with the result that a substantial surplus of liquid is required.

An additional object of the invention is the provision of a photoelectric measuring device by use of which the desired measure of optical density may be obtained from a small sample size specimen of the liquid to be analyzed.

Also, prior portable devices of the above type have been abnormally bulky and susceptible to being injured or accidentally misadjusted, the likelihood of injury and accidental misadjustment being due to the employment of adjustable means requiring pre-positioning prior to use of the device for obtaining a reading, and which adjustable means is exposed and readily moved by accidentally striking the interior of the vessel containing the liquid in which it is to be submerged, or accidentally striking other objects.

Other objections to prior portable devices of the character described are the impossibility of obtaining an accurate reading for liquids of very high density due to inability to shorten the optical path of light through the liquid to a degree where an accurate reading may be obtained.

In clinical and chemical laboratories, it is customary to employ stationary photoelectric measuring devices of substantial size having a recess in which a transparent capsule containing the liquid to be examined is positioned. Thus, a person examining a specimen liquid must fill each capsule, take it to the stationary installation, take a reading, and then return the liquid or capsule to its original location. Normally the capsule is of a predetermined size thus restricting the light path to a predetermined length which necessitates a highly complicated system to obtain readings of densities that may be relatively high or low.

The present invention provides a simple means and method for overcoming the above objections and difficulties.

Other objects and advantages will appear in the description and drawings, including the provision of a device that may be quickly cleaned for reuse after the examination of each liquid, and one in which the light beam is not required to pass through the walls of a container holding the liquid to be examined.

In the drawings, FIG. 1 is a vertical cross-sectional view taken through a device, disclosing the invention.

FIG. 2 is a horizontal cross-sectional view taken along line 2—2 of FIG. 1.

FIG. 3 is a top plan view as seen from line 3—3 of FIG. 1.

FIG. 4 is a horizontal cross-sectional view taken along line 4—4 of FIG. 1.

FIG. 5 is a cross-sectional view taken along line 5—5 of FIG. 1.

FIG. 6 is a fragmentary side elevational view of a portion of the left side of FIG. 1 showing the reading scale and the indicator for indicating the reading point.

FIG. 7 is a reduced size elevational view of the device of FIG. 1 but in a position at a right angle thereto for showing the indicating element and reading point, the device being shown in a position for withdrawing a liquid from a sealed container, the latter being shown partly broken away and in section to show the seal.

FIG. 8 is a part sectional part elevational view of a modification of the device shown in FIG. 1.

FIG. 9 is a top plan view of FIG. 8.

FIG. 10 is an enlarged fragmentary cross-sectional view of a portion of the device of FIG. 9.

FIG. 11 is a part sectional part elevational view of a modification of the device of FIGS. 1 and 8.

The device illustrated is of generally syringe construction in that it comprises a main tube or barrel 1, open at one end (the upper end in FIG. 1) and into which open end a piston or plunger, generally designated 2 is removably fitted for reciprocable movement. The opposite end is provided with an elongated needle 3, such as a conventional hypodermic needle, extending axially outwardly of the tube 1 and provided with a central passageway that communicates with the interior of the tube 1.

By this structure, the liquid to be analyzed will be drawn into tube 1 when the open lower end of the needle 3 is within the liquid and the piston or plunger is moved outwardly of the tube 1, and upon reverse or inward movement of the plunger 2 relative to tube 1 the liquid drawn into the tube 1 will be expelled from the tube.

The base 5 of needle 3 is exteriorly tapered to form press-fit for frictionally engaging the complementarily interiorly tapered nipple 6 on a head 7 at the lower end of the tube 1, as seen in FIG. 1. This structure is conventional and enables the needle 3 to be readily removed or replaced, and when removed, the liquid that may remain in the tube 1 after the main body of liquid drawn into the tube has been ejected by movement of the plunger 2 to collapsed position or toward head 7, may be drained from the tube, and the plunger is easily and quickly withdrawn from the open upper end of the tube to facilitate such drainage and to permit flushing of the interior of the tube, if and when desired.

Within the lower end of tube 4 and adjacent to head 7 is a right angle rectangular prism 9, its corners being secured stationary relative to the tube by any means, such as cement or lugs 10 (FIG. 4) or any other suitable mounting, to the tube, so that its right angle reflecting surfaces 13 (FIG. 1) intersect on the axis of the tube 1 at 90 degrees and are lowermost, and which surfaces are of equal size and outline, similar to a Porro prism. The light transmitting surface 14 faces away from the head 7, or upwardly as seen in FIG. 1, and toward the plunger 2, and is perpendicular to the axis of the tube. With this arrangement, there can be no relative movement between any of the surfaces 13, 14. Surfaces 13 are preferably silvered or treated to insure total reflection of light rays passing through surface 14 normal to the plane of the latter.

The plunger 2 is hollow and is provided with a head 15 at its lower end.

The head 15 may be relatively thick axially of the plunger, and is formed with a pair of axially extending parallel passageways 16, 17 equally spaced at opposite sides of the central axis of the plunger, and separated by a partition 18. Each of these passageways is open ended but their lower ends are respectively closed by similar plain transparent lens or discs 19, 20 that are sealed liquid-tight by cement or any other suitable means.

Within the upper portion of passageway 16 are one or more conventional collimating lens 23, as may be desired, of suitable design and arrangement for concentrating light rays from an electric light bulb 24 to parallel relation for passage through the liquid to be analyzed.

The bulb 24 may be of the conventional type that includes lens-tip 25 for concentrating the rays from the filament and the bulb may be removably secured in a socket that, in turn, is secured to a bracket 26, held stationary with the plunger for supporting the bulb coaxial with passageway 16, spaced above the upper end of the latter the desired distance. Any conventional adjusting means (not shown) may be employed for focussing and centering the bulb.

The head 15 may be drilled or molded to provide the passageways 16, 17 therein, and said head may also be interiorly cored between the passageways, if desired, to reduce material and weight (FIG. 5), but the lower end portion of the head, in which the discs or lens 20 are positioned, is liquid-tight. The plunger 2 may be formed with sufficient accuracy to be liquid-tight within tube 1 but, if desired, an O-ring 28 may be positioned within an annular recess formed in the radially outer surface of the plunger adjacent to its lower end.

Within passageway 17 at a point substantially opposite to the collimating lens and spaced above the flat surface 14 of prism 9 at a distance substantially equal to the distance between the collimating lens and said surface, is the radiation or light sensing or detecting unit 29. This sensing unit is conventional and generates or modulates an electric signal as a function of the beam of light striking it.

Spaced between the bulb 24 and the upper end of the plunger is a filter-wheel 30 that is coaxial with the plunger and which wheel carries an annular row of optical color filters 31 (FIG. 2) around its axis. This filter wheel is supported on the lower end of a shaft 32, which shaft is centrally supported from the upper or outer head 33 of the plunger 2 for rotation of the wheel about the axis of the plunger to selectively position the desired filter between the bulb and the collimating lens, according to the color of the liquid being examined.

The shaft 32 rotatably extends through the head 33 and is provided with a finger engageable knob 34 having an indicator arm 35 (FIGS. 1, 3) projecting radially therefrom (FIG. 3) for selectively pointing to symbols 36 inscribed or marked on the outer surface of head 33. These symbols designate the filter 31 that may be between the light source 24 and the collimator 23. In FIG. 3 the Y may indicate that a yellow filter is between the bulb 24 and the collimator. If the indicator were moved to C it would indicate that either no filter, or a clear one, were in position between the bulb and collimator.

In normal practice, the head 33 is rigid with the plunger 2 and it may be removably sealed or locked to the plunger by set screws 37 or by any other suitable means and the knobs 35 is removably pinned to the shaft 32 by a suitable pin or set screw 38 against removal or rotation relative to the shaft until the pin or set screw 38 is removed. A flange 39 depends from the outer edges of the head 33 and fits over the upper outer marginal surface of the plunger tube 2. Set screws 37 extend through this flange into the plunger, and the free axially downwardly facing edge of the flange provides a stop for engaging the free axially upwardly facing edge of tube 1 when the device is in fully collapsed position. The distance between the free edge of the flange 39 and the free upper edge of tube 1 is preferably vary slightly less than the distance between the surface 14 of prism 9 and the inner head 15 of the plunger. Thus, when the plunger is in fully collapsed position, the head 15 will not strike the prism 14 to loosen, misplace or injure the latter or the lens or discs 19, but said head may move to within a small fraction of an inch from the upper surface 14 or prism 9, to leave a space substantially only sufficient to preclude engagement of the lower surface of head 15 with said upper surface 14.

Secured to the outer end of plunger 2, by flange 39 of head 33, is one end of an indicator arm 40, which arm extends alongside the outer side of plunger parallel with the axis of the latter to a point even with the lower surface of head 15. This arm is spaced from plunger 2 and extends over the outer side of the tube 1, and is formed along its side that faces the plunger with a rib 43 (FIGS. 1, 2) extending longitudinally of the plunger and tube 2, which rib may be of dovetail cross-sectional contour to slidably fit in a complementarily formed groove 44 in the outer side of tube 1. By this means the arm 40 is held to the tube 1 against being sprung outwardly, and it also cooperates with set screws 37 to prevent rotation of the head 33 relative to the plunger.

The outer surface of the tube 1 along the opposite sides of groove is formed with a scale 45 of graduations (FIG. 6) that are marked with suitable figures to indicate the distance between the upper surface 14 of prism 9 and the lower surface of head 15, or to indicate the length of the optical path of the light beam in the liquid in the space between said upper surface 14 and head 15, as will later be explained more in detail.

It is obvious that similar scale 47 (FIG. 6) in the form of a row of graduations may be inscribed on a side of plunger 2 with the upper free edge of the tube 1 being the reading point.

Where arm 40 is used, its lower end defines the reading point on the scale 45. Where the arm 40 is used, its lower end is at the exact level of liquid in the space 48 between prism 9 and head 15 or the exact position of the lower end of the plunger 2 within tube 1.

The sources of energy for light bulb 24 and the indicator or sensing element 29 including any amplifying means for the latter may be outside the device, and the conductors may extend through the head 33 in any suitable manner to sockets 49 (FIG. 3) for connection in the electrical circuits. The indicator arm 35 will freely pass over the sockets incorporated in head 35.

All of the indicator arm 40, or at least the lower end portion 50 (FIG. 6) may be of a color or form to distinguish it from the scale 45 to facilitate rapid reading of the scale.

Where the liquid to be analyzed is in a sterile condition, or is sealed against contact with ambient air within a jar 53 or other receptacle (FIG. 7), sealed with a rubber diaphragm or top 54, the needle 3 may be thrust through the diaphragm, or through a self-sealing opening therein, and into the liquid 55 within the jar. The seal between the sides of the opening in the diaphragm will be maintained against the sides of the needle, both when the needle 3 is inserted and withdrawn. At the time of insertion of the needle 3, the plunger is preferably in fully collapsed position. Upon drawing the plunger 2 outwardly relative to the tube 1, liquid will be initially drawn through the inlet 4 and nozzle 6 and into the lower end of tube 1 to a level spaced above surface 14, or through spaces 57 (FIG. 4) between the corners of the prism thus filling the tube 1, after which the device is withdrawn from liquid 55 or from whatever liquid is to be analyzed, and is inverted and the plunger moved to exhaust any air from space 48 so that the liquid fills space 48.

The beam 56 from the light rays from bulb 24, upon actuation of the latter, will be collimated and will pass parallel with the axis of tube 1 through the liquid in space 48 and light transmitting surface 14 to the reflecting surface 13 directly therebelow and will be reflected through the prism to the other light reflecting surface 13 and then reflected along a line parallel with the axis of tube 1 to the sensing device 29 for activating the latter to generate or modulate energy that, in turn, is amplified for reading on a conventional meter (not shown) in said sensing circuit. The length of the optical path of travel of the light beam is double the distance between the surface 14 and the head 15, and this length in the present instance can be varied from substantially zero (when the plunger is in fully collapsed position) to the limit of practical extension of the plunger 2 outwardly of tube 1, and the operator may make his readings as the plunger is being withdrawn from collapsed position to extended position after exhausting the air from the space 48. It is understood that each reading is related to the length of the optical path of the light within the liquid in space 48, hence the optical density of the liquid can be readily determined at any time an adequate reading can be made.

Heretofore, where a device must be preset to provide an optical path of travel of a certain length, and the device thereafter immersed in the liquid, it often occurs that the setting is insufficient to provide an optical path of a length that will provide an adequate reading and the device must be withdrawn and reset to increase or to decrease the length of the optical path when the device is re-submerged. These adjustments may take considerable time since the optical density of the liquid is not known, and many times an inadequate reading is taken as final, rather than to make more adjustments to improve it.

With the present invention where ample provision is made for providing an optical path of any practical or necessary length without removing the device from the liquid and within seconds of time, the operator may invariably obtain an adequate and accurate reading.

The device can readily be cleaned after each reading by repeated flushing of the same with a suitable medium and emptying it, and if desired, the needle 3 is quickly replaceable.

The prism 9 provides an efficient reflecting surface, and also the prism provides a flat upper surface so that the length of an optical path in liquid within space 48 may be an almost immeasureable fraction of an inch for extremely dense liquids. Since the prism is a unit and is stationary within tube 1, there can be no relative movement between any of its surfaces, and the prism may be so rigidly fixed in the tube 1 as to withstand severe shocks without change in position.

The tube, plunger 2, nipple 6 and needle 3, and surfaces 13 are opaque, or are coated, so as to be opaque, hence all ambient light is excluded, which is important for optimum accuracy, and a cap or closure 58 may be positioned over passageway 17 to isolate the sensing element 29 from the light from the bulb 25.

The bulb 24 may be a source of radiation of rays of suitable type adapted for travel along the path described and for reflection to a sensing device that, in turn, is adapted to be activated for providing a measure of the intensity of the rays impinging it. Thus, reference to the bulb as a "source of light" is not to be considered as limiting to rays of any particular type, nor is the reference to "light rays" necessarily to be considered as limiting to rays of any particular wave length.

In the form of invention illustrated in FIG. 1, the portions of light beam 56 that travel through the liquid in space 48 are not isolated from each other.

FIG. 8 shows a structure in which an elongated outer body, generally designated 60, is formed with a pair of cylindrical, parallel passageways 61, 62 of equal length and diameter, in side-by-side relation and spaced apart by a partition 63. This body is shown as being vertical in FIG. 8, hence the words "upper," "lower" and words of similar meaning are used with respect to the position shown in FIG. 1.

The lower end of body 60 is closed and a right angle reflecting prism 64 is positioned at its lower end with its light transmitting surface 65 in engagement with the lower edges of the body 60 around the lower open ends of passageways 61, 62. Surface 65 is in a plane normal to the axes of the passageways 61, 62 and the lower side of the prism is defined by light reflecting surfaces 66 extending downwardly from opposite outer edges of the surface 65 to intersect at 90° along a line centrally between the axes of the passageways 61, 62, the same as surfaces 13 in FIG. 8.

An opening 67 in partition 63 communicates between the lower ends of passageways 61, 62 at the level of the upper surface 65 of the prism, which opening may be a recess formed in the lower edge of partition 63.

An inlet 68 opens into the lower end of one of said passageways 61, 62 through a side wall of body 60 at the upper level of surface 65, which inlet is in one end of an elbow fitting 69, and the outer end 70 of said fitting may be turned downwardly and exteriorly tapered for receiving the complementarily tapered inner surface in a base 73 of a conventional hypodermic needle 74 that extends downwardly below the lower end of body 60.

A pair of parallel cylindrical tubes are telescopically fitted within passageways 61, 62 to provide a pair of plungers 75, 76 reciprocable within said passageways.

The upper ends of said tubes extend to and are connected with each other by a housing generally designated 77.

The lower end of plunger 75 is closed by a clear transparent closure 78, and a similar closure 79 closes the lower end of plunger 76, said closures being preferably at the same level and secured to said plungers.

The plungers 75, 76 preferably fit within passageways 61, 62 sufficiently close to eliminate the need for any packing.

A plurality of different colored light filters may be provided for removably fitting over the lower end of plunger 75, each filter being in a holder having a flange 80 being adapted to functionally receive the lower end of tube 75 for holding the filter substantially against closure 78. To change filters, it is merely necessary to withdraw the plungers 75, 76, the filter on plunger 75 and reinsert the plungers.

A collimator lens 84 is secured within plunger 75 coaxial therewith, spaced above closure 78, and a light bulb 85 is also secured within plunger 75 in a position spaced above the lens 84. This arrangement substantially corresponds with the arrangement of closure 19, lens 23, and bulb 24 in FIG. 1.

Spaced above the closure 79 in plunger 76 is a photoelectric light sensing element 86.

Conductors 87 extend upward in plunger 75 to housing 77 in which a conventional switch is actuatable by a finger engageable button 89 for closing the circuit.

Conductors 90 connect the sensing device with a battery 93 in a circuit including an indicator 93 (FIG. 9) responsive for movement from a current that is generated or modulated as a result of a beam 94 from bulb 85 striking the photoelectric sensing device 86. A manually actuatable switch 96 is in the circuit 90 to close the latter to actuate the indicator. The electrical circuits employed, including the cell or sensing device 86, are old in the prior art, but insofar as I am aware they have not been employed in a portable device of the character herein described, which combination enables a person to make an analysis to determine the optical density of a liquid without resorting to an outside source of electrical power.

In operation the housing 77 may function as a handle to be grasped for effecting outward movement of the plungers 75, 76 from a collapsed position in order to draw liquid into the passageways 75, 76 through the needle 74. The air may be exhausted in the conventional manner and a reading immediately taken for obtaining the optical density of the liquid.

Inasmuch as the portions of beam 94, in the lower ends of passageways 61, 62, are completely isolated from each other, the light from said portions cannot influence each other, it being understood that the walls of the body 60 and partition 63 are opaque or are coated to render them opaque, and the interior surfaces exposed to light from the beam 94 are preferably non-reflective.

A more simple embodiment of the invention is shown in FIG. 11 in which the body of the device comprises a single elongated outer tube 100 having a single tubular plunger 101 reciprocable therein. The lower end of plunger 101 is closed by a clear transparent disc in closure 102, and a light filter 103 of the same structure as that of filter 83 may be removably secured to said lower end of plunger 101.

A light sensing device 104 adapted to function in the same manner as photoelectric sensing devices 29, 86 is secured within the lower end of the tube 100 with its light engaging surface spaced above its lower terminating end of the tube 100. An inlet 105 opens into the lower end portion of body 100 adjacent to said light engaging surface and which inlet is in one arm of an elbow fitting 106. The other arm is directed downwardly and is adapted to be frictionally fitted within the socket base 107 of a conventional hypodermic needle 108 in the same manner as described for the needle 74 of FIG. 8.

The conductors 109 from the photoelectric light sensing member 104 in this case extend from the lower end of the tube 100, outwardly of the tube 100.

A light bulb 110 is secured within plunger 101 in a position spaced above a collimator lens 111 in the same manner and relation to each other as bulb 85 and lens 84 in FIG. 8, and the conductors 112 for bulb 110 extend to a socket fitting closing the upper end of the plunger 101, for connection with an outside source of electricity.

In this instance there is no reflection of the beam 113 that comes from bulb 110, hence the device will be longer than that of FIGS. 1 and 8 in order to obtain the maximum length of travel of beam 56 in FIG. 1 and of beam 94 in FIG. 8.

Graduations 114 (FIG. 8) and 115 (FIG. 11) that correspond to scale 47 in FIG. 6 may be used. When the plungers are fully collapsed their lower ends are respectively preferably almost in engagement with the surface 65 (FIG. 8) or with the light impinging surface of the sensing element 104 (FIG. 11); hence the length of the optical path of travel of beam 94 or 113 in the fluid is readily determinable.

The smallness of passageway through the hypodermic needle precludes drainage of liquid from within the tube by gravity, hence the device may be readily lifted from the supply of fluid that is drawn into the device.

Also, the fact that an adequate and accurate analysis can be made from only a sufficient amount of fluid to provide a path of sufficient length for the light or radiation beam is important, as distinguished from devices that require a sufficient supply for immersing the device therein.

The present invention has many uses, such as in examinations where it is necessary to exclude oxygen or other reactive gases. Also the structures disclosed may be duplicated in a single device or several may be used where one fluid contains the substance under examination in an unknown concentration and a corresponding fluid has a known concentration of the same substance. A comparative reading of the two enables a quick and highly accurate determination of the unknown concentration.

In its broadest sense, the method disclosed is one in which a beam of light or radiation beam 56, 94 or 113 is directed along a predetermined optical path of travel that is fully enclosed against admission of ambient rays of light thereto. A progressively increasing length of a section of said beam is enclosed in tube 1, 60 or 100 by the fluid to be measured for optical density, and the measure and visible indication of the degree of absorption of the light of said beam is made at any desired point as the length of the fluid enclosed beam increases.

In each form of the measuring device, these is an elongated tube with an inlet at one end and a plunger reciprocable within the tube to draw a body of fluid of progressively increasing length into the tube. The plunger carries the light or radiation source to direct a beam through the tube and along a path of progressively increasing length within the body of fluid that is directly proportional to the increase in the length of the body. Light sensing device 29, 86, or 104 is supported within the measuring device in a position for impingement of the beam on the element during and after passage of the beam through said body so that at each point during the increase in the length of the beam enclosing body of fluid, a reading from the sensing device will indicate the degree of concentration or optical density of fluid through which the beam passes.

The device as illustrated is one example of the invention, but it is to be understood that various changes, modifications and substitutions may be made within the scope of the appended claims without departing from the scope of the invention.

I claim:

1. A portable photoelectric measuring device for use in making light absorption measurements of fluids, comprising:
   (a) an elongated tube having an inlet for fluid at one end thereof and an elongated hollow plunger reciprocable within said tube toward and away from said inlet for drawing a body of fluid of progressively increasing length into said tube upon movement of said plunger in a direction away from said inlet, one end of said plunger being adjacent to said inlet;
   (b) radiation means carried by said plunger in a position for directing a radiation beam from said means through said tube and said body and along a path of progressively increased length within such body, directly proportional to the increase in the length of said body;

(c) a sensing element actuatable by and upon impingement of said beam thereon to provide an electrical signal that is variable according to the optical density of said fluid and the length of said path, and (d) means supporting said element within said device and in a position for impingement of such beam on said element during the lengthening of said body, whereby different lengths of said beam will impinge on said element according to the length of said body during said movement of said plunger in said direction away from said inlet.

2. In a device as defined in claim 1:
(e) indicating means respectively on said plunger and on said tube in cooperative relation for visibly indicating the length of the beam that is within said body;
(f) a hollow needle connected with said inlet and projecting from said tube generally axially thereof in a direction outwardly of said one end for insertion into a supply of the fluid to be examined.

3. In a device as defined in claim 1:
(e) said radiation means being an electric light bulb secured within said hollow plunger at a point spaced from said one end thereof, and a transparent closure closing said one end through which said radiation beam is adapted to pass;
(f) means for connecting said light sensing element with an indicator for indicating the degree of adsorption of said radiation beam by said body;
(g) a collimator lens in said plunger between said radiation means and said closure for concentration of rays of light from said radiation means to form said beam.

4. In a device as defined in claim 1:
(e) said radiation means being an electric light bulb secured within said hollow plunger at a point spaced from said one end thereof;
(f) an electrical circuit respectively within said plunger for said sensing device and said radiation means;
(g) an electrically actuatable signal in the circuit with said sensing device for providing said electrical signal, and
(h) a source of electricity carried by said device in said circuits.

5. In a device as defined in claim 1:
(e) said plunger having a pair of passageways therein extending longitudinally thereof in side-by-side relation parallel to the axis of said plunger, each having one end adjacent to said inlet;
(f) said radiation means being an electric light bulb supported within one passageway of said pair spaced from said one end thereof;
(g) transparent closures closing said one of the ends of said passageways;
(h) said sensing element being supported within the other passageway of said pair spaced from said one end thereof;
(i) a right angle prism having a light transmitting surface normal to the axis of said plunger extending across said one of the ends of said passageways with right angle reflecting surfaces extending convergently away from said plunger for reflecting the beam from said radiation means into said other passageway for impingement of said sensing element.

6. In a device as defined in claim 5:
(j) said light transmitting surface on said prism being approximately in engagement with said one of the ends of said passageways when said plunger is in its fully collapsed position, and
(k) said inlet being in said tube above the level of said light transmitting surface whereby upon movement of said plunger away from said light transmitting surface and when said inlet is in communication with fluid to be drawn into said tube, such fluid will be between said one of the ends of said passageways and said light transmitting surface.

7. In a device as defined in claim 5:
(j) said light transmitting surface on said prism being approximately in engagement with said one of the ends of said passageways when said plunger is in its fully collapsed position within said tube;
(k) said tube including a partition disposed between said passageways and fixed relative to said plunger providing a light barrier between said passageways during movement of said plunger, and
(l) said plunger being in two sections with one of said passageways in each section and said sections being on opposite sides of said barrier.

8. The method of measuring the optical density of light transmitting fluids of varying densities that comprises the steps of:
(a) directing a beam of light from a source thereof along a predetermined path of travel enclosed against admission of ambient rays of light thereto;
(b) progressively drawing from a source thereof the light transmitting fluid to be measured for its optical density and interposing said fluid, as so drawn, across a progressively increasing length of a section of said path directly proportional to the amount of fluid drawn from said source for passage of said beam through the fluid so interposed;
(c) measuring and visibility indicating the degree of absorption of the light of said beam by the fluid so interposed across said path during the progressive interposing of said fluid across said path whereby a reading of optimum accuracy as to the density of said fluid will be obtained.

References Cited

UNITED STATES PATENTS

| | | | |
|---|---|---|---|
| 2,324,304 | 7/1943 | Katzman | 250—218 |
| 2,637,817 | 5/1953 | Herbert | 88—14 |
| 3,141,094 | 7/1964 | Strickler | 250—218 |
| 3,142,719 | 7/1964 | Farr | 88—14 |

RALPH G. NILSON, *Primary Examiner.*

M. ABRAMSON, *Assistant Examiner.*

U.S. Cl. X.R.

356—208